United States Patent [19]

Elsas

[11] Patent Number: 5,169,519

[45] Date of Patent: Dec. 8, 1992

[54] OIL SPILL RECOVERY SYSTEM

[76] Inventor: Norman E. Elsas, 969 Greenwood Ave., Atlanta, Ga. 30306

[21] Appl. No.: 849,487

[22] Filed: Mar. 11, 1992

[51] Int. Cl.5 .............................................. E02B 15/04
[52] U.S. Cl. ................................ 210/145; 210/242.3; 210/242.4; 210/923; 210/924
[58] Field of Search ..................... 210/143, 145, 242.3, 210/242 V, 776, 923, 924

[56] References Cited

U.S. PATENT DOCUMENTS

| | | | |
|---|---|---|---|
| 3,679,058 | 7/1972 | Smith | 210/242.3 |
| 3,817,385 | 6/1974 | Bergman | 210/242.3 |
| 3,962,083 | 6/1976 | Goldman | 210/924 |
| 4,146,477 | 3/1979 | Challener | 210/924 |
| 4,341,637 | 7/1982 | Smith | 210/924 |
| 4,349,439 | 9/1982 | Lundin | 210/923 |
| 4,356,089 | 10/1982 | Challener et al. | 210/924 |

*Primary Examiner*—Stanley S. Silverman
*Assistant Examiner*—Christopher Upton
*Attorney, Agent, or Firm*—James B. Middleton

[57] ABSTRACT

An oil spill recovery system deposits a polypropylene quilt onto an oil spill on water, the quilt being deposited at the speed of movement of a water craft so there is no relative motion between the quilt and the water. The quilt is allowed to rest for a given dwell time, then picked up at a speed to prevent relative motion between the quilt and the water. The quilt is retrieved and placed into a first scray. Squeeze rolls remove the quilt from the first scray and squeeze oil therefrom. A plurality of scrays and squeeze rolls may be used. A sewing machine or heat sealing apparatus may be disposed between two scrays so the quilt can be spliced as necessary during operation of the system.

9 Claims, 3 Drawing Sheets

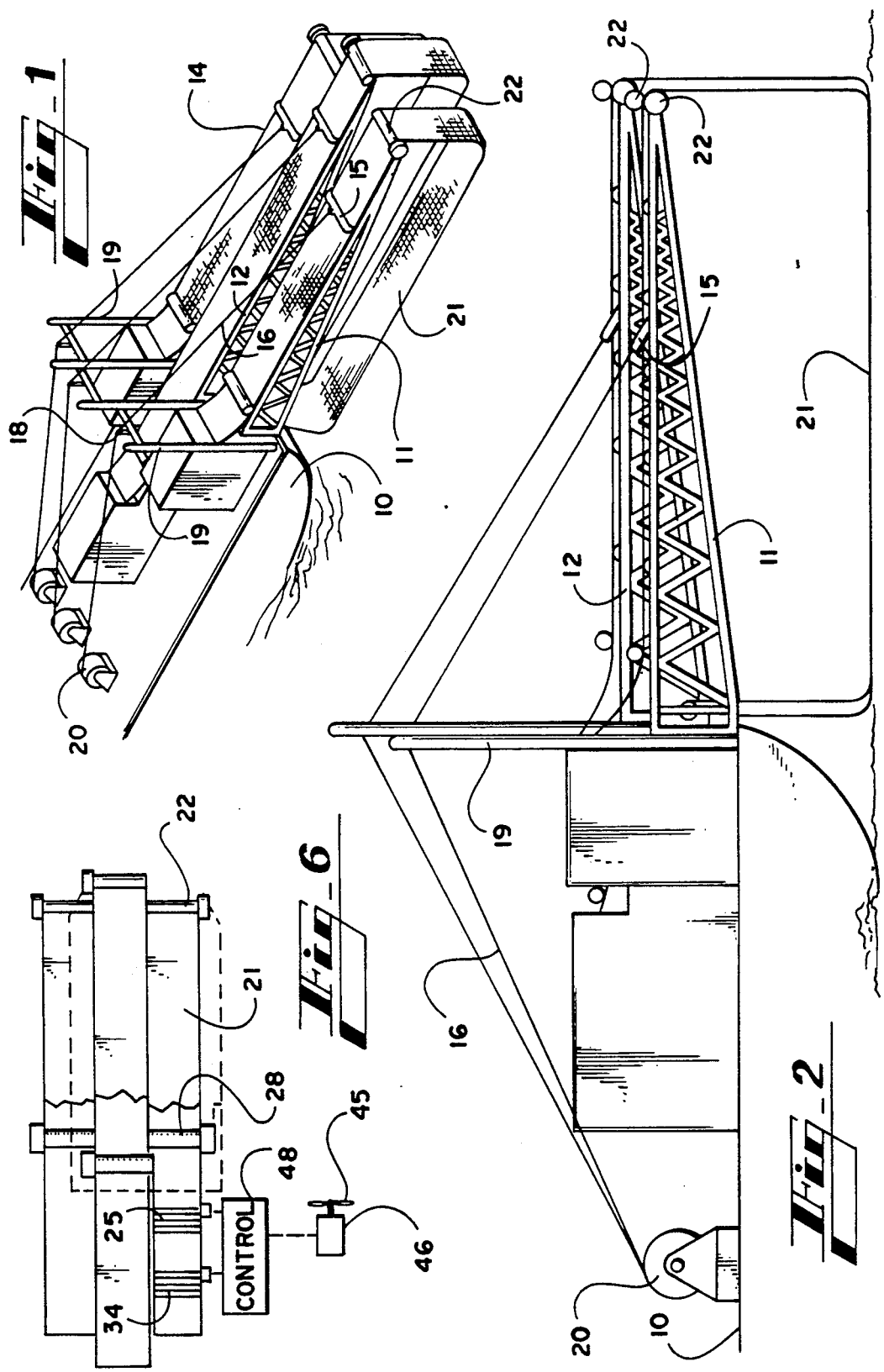

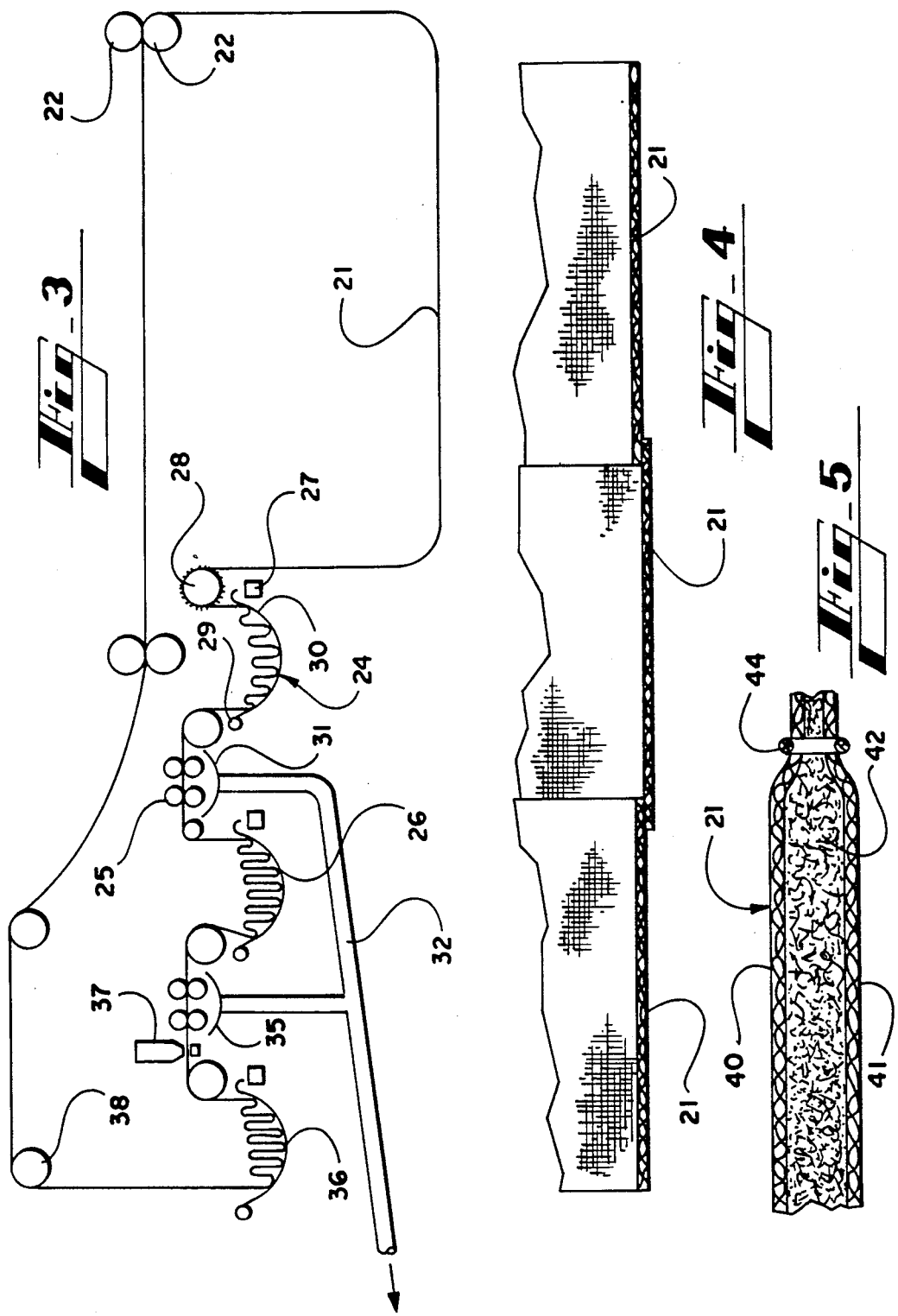

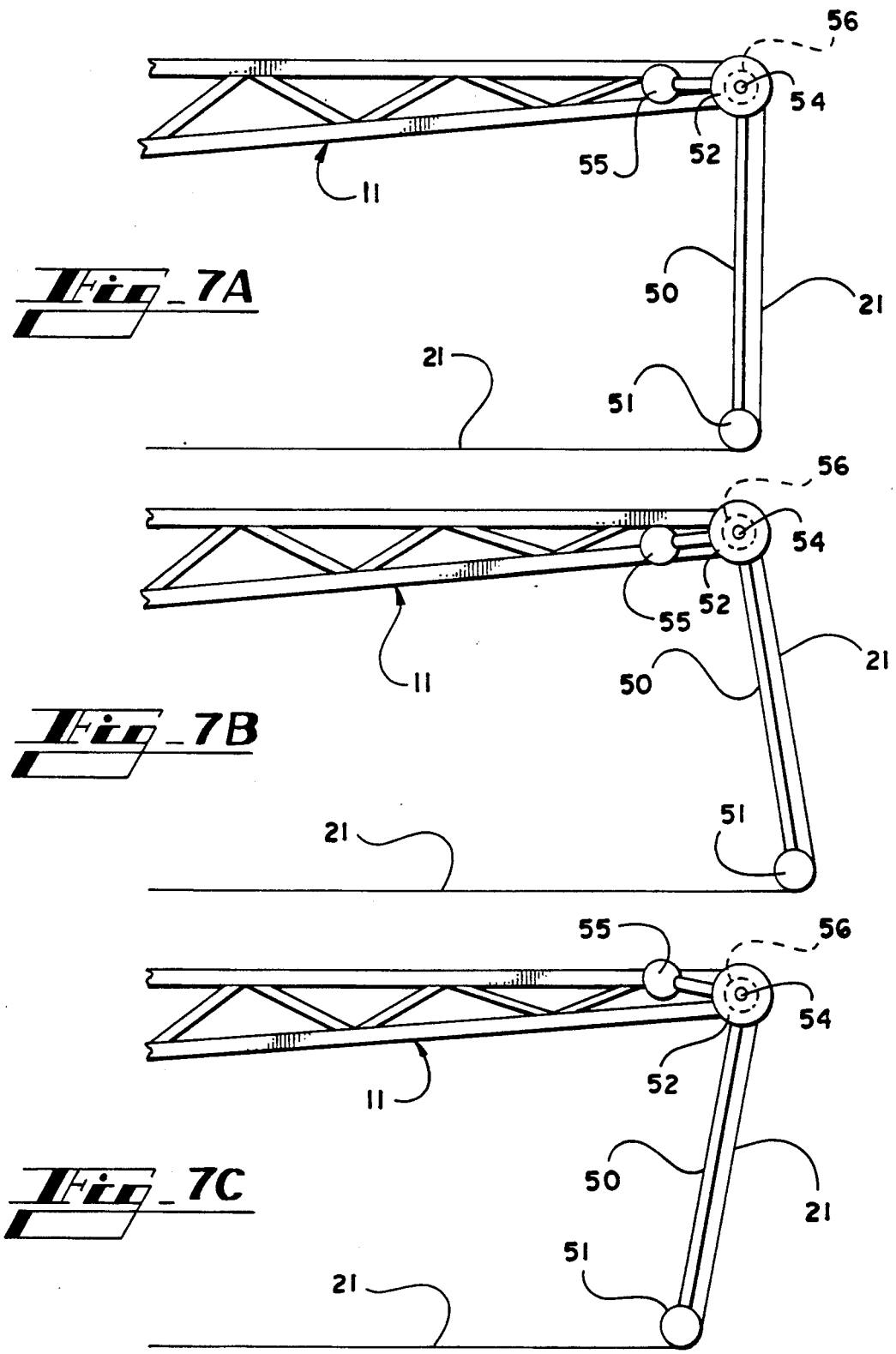

OIL SPILL RECOVERY SYSTEM

INFORMATION DISCLOSURE STATEMENT

In view of the quantity of petroleum and petroleum products that are shipped over water, it must be accepted that there will be spills of petroleum and petroleum products. The problem to be solved therefore is the recovery of the petroleum, and the recovery as quickly as possible before the material disperses and causes ecological damage.

The prior art techniques for recovery of petroleum from water includes the use of various skimmers, many using a vacuum to pick up the petroleum products floating on the surface of the water. There has also been considerable effort in utilizing absorbent material to absorb the petroleum products in order to remove the products from the surface of the water. Many of these absorptive type devices operate a drum or belt at a relatively high velocity which results in an emulsion containing both oil and water. The oil and water must subsequently be separated in an additional step which is both time consuming and expensive. As a result, there is a device mounted on a catamaran wherein a string mop arrangement is laid on the surface of the water to absorb oil, then picked up and squeezed. One object of the device is to have no relative motion between the mop and the water. However, a string mop is always difficult to squeeze sufficiently, and agitation of the oil and water is likely because of the many strings that can move relative to one another.

SUMMARY OF THE INVENTION

This invention relates generally to oil spill recovery systems, and is more particularly concerned with a continuous, quilt having an oil absorbing batting confined by hydrophobic sheets.

The present invention provides at least one boom or the like for delivering a quilt to deposit the quilt onto the surface of water containing an oil spill. The boom is carried by a water craft that is moved along the surface of the water at a predetermined speed. The quilt is then laid on the water at the same speed as the speed of the water craft so the quilt will not move relative to the water. The portion of the quilt towards the water craft is lifted from the water, being lifted at the appropriate speed so that the quilt is not moved relative to the water. The quilt is lifted substantially vertically so that the hydrophobic material will shed water, while the oil absorbent material will retain the oil. The quilt is squeezed to remove the oil, and the quilt is returned to the boom for redepositing on the surface of the water.

The present invention therefore provides a system for retrieving oil wherein a quilt is placed carefully on the surface of the sea, the quilt being such as to absorb oil and not to absorb water. After an appropriate dwell time for the quilt to absorb the oil, the quilt is carefully removed from the surface of the sea. Because of the lack of motion between the quilt and the water, and the care not to disturb the water, there will be no emulsification of the oil and water requiring subsequent separation.

BRIEF DESCRIPTION OF THE DRAWINGS

FIG. 1 is perspective view showing apparatus made in accordance with the present invention, the apparatus in FIG. 1 including three juxtaposed quilts;

FIG. 2 is an enlarged, side elevational view of the apparatus shown in FIG. 1;

FIG. 3 is a schematic illustration showing the path of the quilt through the entire cycle;

FIG. 4 is a transverse cross-sectional view through the three quilts of FIG. 1 and showing the overlap;

FIG. 5 is a highly enlarged cross-sectional view showing the construction of the quilt used in the present invention;

FIG. 6 is a schematic illustration showing drive and control means for use with the apparatus of the present invention; and, FIGS. 7a–7c are fragmentary side elevational views showing a modified speed control for the quilts.

DETAILED DESCRIPTION OF THE EMBODIMENT

Referring now more particularly to the drawings, and to that embodiment of the invention here presented by way of illustration, FIG. 1 shows a water craft designated at 10 having three booms designated at 11, 12 and 14, extending forwardly from the water craft 10. As here shown, each of the booms 11, 12 and 14 includes a bracket such as the bracket 15 for receiving a cable 16. The cable 16 extends over a pulley 18 supported between uprights 19, the cable 16 then extending down to a winch 20. It will therefore be understood that the winch 20 can be operated to raise or lower the boom 11 as desired. Further, the booms 12 and 14 are similarly arranged, but the structure is the same and the description need not be repeated. Those skilled in the art will also understand that numerous other arrangements for supporting the boom may also be used. For example, the boom may be rigidly fixed to the water craft 10 and simply cantilevered over the water at the desired distance and height.

Rearwardly of the boom 11, and supported on the deck of the water craft 10, there is an oil recovery means for removing the absorbed material from the quilt. It will therefore be understood that the quilt 21 is pulled out to the extending end of the boom 11 by the drive rolls 22. The quilt is then dropped substantially vertically to lie on the surface of the water. Towards the water craft 10, the quilt 21 is lifted from the water, again in a substantially vertical path, and delivered to the recovery means. The quilt passes through the recovery means and is again carried to the end of the boom 11 and the process is repeated.

Attention is now directed to FIG. 3 for a more detailed understanding of the system of the present invention. In FIG. 3, the boom and other such parts have been omitted so the path of the quilt can be better seen. Necessary apparatus is shown schematically. The individual pieces of equipment are well known to those skilled in the art, so the schematic showing will be sufficient.

It will be understood that the rolls 22 must be driven in order to pull the quilt 21 out to the end of the boom. The speed of the rolls 22 will be controlled to be commensurate with the speed of the water craft 10 over the surface of the water. Those skilled in the art will understand that, if the rolls 22 are driven at the appropriate speed, the quilt 21 will descend generally vertically as illustrated, and be laid onto the surface of the water without relative motion between the quilt 21 and the water, or the oil thereon. Similarly, the retrieval roll 28 will be driven at a speed commensurate with the speed of the water craft so the quilt 21 will be picked up at the same rate it is laid down. This will result in a generally vertical rise of the quilt from the surface of the water.

The retrieval roll is here shown as a needle roll to lift the quilt 21 without exerting sufficient force to squeeze the absorbed oil therefrom. Opposed rolls for driving the quilt 21 may cause at least some squeezing of the quilt 21, which may cause some oil loss. It will therefore be understood that the retrieval rolls 28 may engage only the edges of the quilt 21, or one might use the needle roll as shown.

The retrieval roll 28 will deposit the quilt 21 into the scray 24. As is known in the art, the scray 24 is pivoted at 29 so the end 30 is movable under sufficient weight. When there is enough weight within the scray 24, the end 30 will move downwardly and engage a switch 27 or the like. In the usual operation of a scray 25, the switch 27 will disable the rolls that introduce material into the scray; however, in the present situation it will be understood that it is desirable to continue to lift the quilt 21 to prevent relative motion between the quilt and the water. As a result, the operation of the switch 27 for the scray 24 may be used simply to operate a signal so that someone can take action as is determined to be appropriate. Alternatively, the operation of the switch 27 may increase the speed of the rolls 25 that remove the quilt from the scray 24.

As shown in FIG. 3, the rolls to remove the quilt from the scray 24 are the squeeze rolls 25. The rolls 25 will act both to drive the quilt 21 through the cycle, and to squeeze the quilt firmly enough to squeeze oil therefrom. Though not here illustrated, those skilled in the art will understand that doctor blades or the like may be used on the lower rolls 25 to assist in removal of the oil. Oil removed by the rolls 25 is caught by the pan 31 which drains into the line 32.

The discharge of the rolls 25 is into a second scray 26. The scray 26 operates just like the scray 24, so no detailed description is thought to be necessary. The material is removed from the scray 26 by a second set of squeeze rolls designated at 34. The squeeze rolls 34 have a pan 35 thereunder to catch the oil removed from the quilt 21, and the pan 35 is connected to the drain line 32.

These squeeze rolls 34 deposit the quilt into a third scray 36. From the scray 36, the quilt is directed over a roll 38 and back to the drive rolls 22. The roll 38 is high enough to allow needed working space between the upper and lower courses of the quilt 21.

Between the squeeze rolls 34 and the scray 36, there is a sewing machine 37, which will be a long arm machine. Furthermore, it may be desirable to use two long arm sewing machines 37, one at each edge of the quilt. With such an arrangement, a portion of the quilt may be removed, and the edges sewn together; or, the quilt may be cut and a new length of material sewn into the quilt.

During a splicing operation with the sewing machine 35, it will be understood that the quilt will continue to be removed from the scray 36 and carried to the end of the boom 11. Also, quilt removed from the water and squeezed will be deposited into the scray 26. If desired, the squeeze rolls 34 may be stopped during the splicing operation so quilt material will accumulate in the scray 26.

In operation of the device, it is contemplated that the water craft 10 will move across the water at a given speed, and the quilt 21 will be laid down at the same linear speed so that the quilt 21 will be stationary with respect to the water. With such an operation, it will be understood that the scrays would be unnecessary since the quilt 21 would be processed and recycled and there would be no accumulation of material. It is preferable, however, to have some leeway in operation of the system. By using the scrays, the squeeze rolls 25 and 34 can be run at different speeds in the event different conditions warrant or require, and defects in the quilt 21 can be patched or removed while the system is in operation.

Attention is now directed to FIG. 1 and 4 of the drawings. FIG. 1 shows three booms, each of the booms having a quilt thereover to be laid on the surface of the water. The idea is to provide a greater width in one pass, so the width in FIG. 1 will be substantially three times the width of one quilt. FIG. 4 is a cross-sectional view through the quilts as they are lying on the water, and the overlap can be seen.

In order to have the quilts overlap as they are deposited onto the water, it will be seen that the booms 11 and 14 are shorter and lower than the boom 12, and the quilts 21 on the booms 11 and 14 are within the loop of the quilt on the boom 12. With such an arrangement, the three quilts can be laid side by side as shown in FIG. 4, with only their edges overlapping. As a result, one can use any practical number of separate quilts laid side by side and overlapping at their edges. While three such quilts are shown, one might use only one quilt, or one might use more than three, the limit being the practical width that can be handled by the particular water craft.

FIG. 5 of the drawings shows a construction contemplated for the quilt 21 for use with the present invention. It is desired to absorb the maximum amount of oil and the minimum amount of water, and to prevent agitation of the oil and water so there will be no emulsification of the oil. As shown in FIG. 5, the quilt generally designated at 21 includes outer sheets 40 and 41 which will preferably be woven fabric, and a batting 42 between the sheets 40 and 41, the batting 42 being a conventional loose fiber or other non woven material. Since polypropylene is known to absorb oil, bu not to absorb water, it is contemplated that polypropylene will be used for both the outer sheets 40 and 41 and the batting 42. The sheets 40 and 41 may be an open weave of polypropylene fibers, the weave being sufficiently open that oil will easily pass through the woven sheets 40 and 41 and into the batting 42 within a reasonable dwell time.

To hold the assembly together, FIG. 5 shows the edges stitched at 44. Any form of stitching or sealing may be utilized; and, since polypropylene is a thermoplastic, it will be understood that the edges may be heat sealed at 44 rather than stitched with an additional thread. Similar stitching may be used throughout the width of the quilt 21 as needed to prevent separation of the layers.

Returning briefly to FIG. 3 of the drawings, and remembering that the quilt is formed of a thermoplastic, those skilled in the art will understand that the sewing machine 35 may be replaced by an ultrasonic sealer, or a radio frequency sealer, or even heated blades, to allow splicing of the quilt 21.

Those skilled in the art will easily devise control systems for the apparatus of the present invention. The critical speeds are the drive rolls 22 that deposit the quilt 21 onto the water, and the retrieval roll 28 that lifts the quilt from the water. These rolls must be driven together, and commensurately with the speed of the water craft 10. FIG. 6 schematically illustrates one arrangement for accomplishing the controls.

It will be understood that, to determine the speed of the water craft 10 through the water, the speed measurement must be taken at a point not affected by the propeller wash, or by the shock wave off the hull of the ship. Thus, it is contemplated that a propeller 45 will be supported from the water craft at an appropriate distance from the hull of the craft. The propeller 45 is connected to a monitor 46 which will generate a signal commensurate with the speed of the water craft. This signal is fed to a controller 48.

The controller 48 will control the power to each of the motors for operating the system of the present invention. As illustrated, the motors may be electric, or hydraulic, or air operated, depending on the specific conditions. It will be recognized that, if a highly volatile substance is being retrieved, electric controls could present a hazard, and fluid operated motors may be preferred.

Another control means for assuring that the quilt is laid on the water properly is shown in FIG. 7a–7c. Those skilled in the art will understand that the arrangement shown may be used on one boom of a plurality of booms; or, a separate device may be installed on each of the booms in use. By way of illustration, a single boom is shown, and designated as the boom 11 having the quilt 21 thereon.

At the extending end of the boom 11, there is a pendulum 50 having a cylindrical end 51 to provide a smooth guide for the quilt 21. The pendulum 50 extends down from a member 52 that is rotatably mounted on axle 54. Extending rearwardly from the member 52, which is opposite from the direction of the motion of the boom 11, is a counterweight 55.

Also mounted on the axle 54 is a speed controller 56, the arrangement being such that, as the member 52 rotates, the speed controller will be adjusted Those skilled in the art will recognize that the speed controller 56 may take the form of a potentiometer if the drive means is electrically controlled, or a valve if the drive is fluid controlled.

With the foregoing description in mind, operation of the arrangement shown in FIG. 7 should be understandable. When the quilt is moving at the appropriate speed so that the quilt is laid on the water without relative motion between the quilt and the water, the pendulum will be as shown in FIG. 7a. When the quilt is being fed too fast from the boom 11, there will of course be a tendency for the material to pile up on the surface of the water. Due to the counterweight 55, however, the pendulum will swing forwardly as shown in FIG. 7b. This motion of the pendulum will result in an adjustment of the controller 56, and the speed of the quilt will be slowed. Similarly, when the quilt is being fed too slowly, the lack of material will cause the pendulum to be pulled rearwardly as illustrated in FIG. 7c. Again, the controller 56 will be rotated to cause an adjustment in the feed of the quilt. The pendulum may swing back and forth seeking proper speed until the required speed is attained.

While the drawings illustrate only the bow of a water craft 10, it will be understood by those skilled in the art that many different forms of water craft may be used. By way of example, a tanker ship can be used, with the booms fixed to the front of the tanker. The tanker will of course have storage space for the oil retrieved by the device. Further, the booms may be mounted at the very front of the tanker as illustrated in FIGS. 1 and 2, or the booms may be mounted at each side of the tanker. If the booms are mounted at each side the booms should be sufficiently removed from the hull of the ship to be in still water instead of water engaged by the shock wave propagated by the bow of the ship moving through the water.

An oil barge might also be used as the water craft for the present invention. Again, the barge is equipped for storing the oil retrieved by the device. Since the barge requires other motive means, care must be taken to avoid placing the quilt of the present invention in the prop wash of a towing ship or tug. To avoid the prop wash, one might use two tugs or other towing ships with the oil retrieval apparatus between the two and out of the prop wash of either. Alternatively, a single tug might utilize a barge as is used in canals, the barge being towed at the side of the tug, and having appropriate rudders to maintain the appropriate attitude of the towed barge. Similarly, as in canals, the motive power may be on the shore, with a canal barge in the water having rudders to maintain the appropriate attitude.

It will therefore be seen that the present invention provides a very efficient means for retrieving spilled oil and oil products from the surface of water. The arrangement is such that the oil and water will not be emulsified but will remain separate. The oil can be retrieved by the quilt, the quilt squeezed to remove the oil, and the quilt returned to the body of water to retrieve more oil. The device is such that it can be mounted on any available type of water craft, so otherwise unused ships or the like may be used. The drive means for the quilt can of course be through the use of hydraulic motors or pneumatic motors, especially if the spill is of a highly volatile material. Otherwise, electric motors or the like may be used as desired.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. An oil spill recovery system comprising an elongated quilt, means for placing said quilt on the oil spill, means for retrieving said quilt from the oil spill, and recovery means for squeezing oil from said quilt and means for collecting the oil squeezed from said quilt, said means for placing said quilt on the oil spill including a water craft movable through the water at a given speed, at least one boom carried by said water craft and extending over the oil spill, drive rolls for dispensing said quilt from said boom and onto the surface of the oil spill, and means for controlling said drive rolls to dispense said quilt at said given speed so that said quilt is stationary with respect to the oil spill, said means for retrieving said quilt from the oil spill comprising a retrieving roll, and drive and control means for driving said retrieving roll at the same speed as said drive rolls for lifting said quilt without relative movement between said quilt and the oil spill, said recovery means comprising at least one scray for receiving said quilt from said retrieving roll and at least one set of squeezing rolls for squeezing oil from said quilt.

2. An oil spill recovery system as claimed in claim 1, said recovery means further including a second scray for receiving said quilt from said squeezing rolls, and a second set of squeezing rolls for removing said quilt from said second scray.

3. An oil spill recovery system as claimed in claim 2, and including pan means beneath said squeezing rolls for collecting oil squeezed from said quilt.

4. An oil spill recovery system as claimed in claim 3, and further including a third scray for receiving said quilt from said second squeeze rolls, and splicing means disposed between said second squeeze rolls and said third scray.

5. An oil spill recovery system as claimed in claim 4, wherein said control means comprises means for monitoring the speed of the water craft.

6. An oil spill recovery system as claimed in claim 1, said quilt comprising a pair of outer sheets of a hydrophobic material that is permeable to oil, and a quantity of batting between said outer sheets, said batting having an affinity for oil.

7. An oil spill recovery system as claimed in claim 6, said outer sheets consisting of woven polypropylene having a sufficiently open weave for receiving oil therethrough.

8. An oil spill recovery system as claimed in claim 7, said batting consisting of unwoven polypropylene fibers.

9. An oil spill recovery system as claimed in claim 1, said at least one boom comprising a plurality of booms extending parallel to one another, and a plurality of quilts, one quilt of said plurality of quilts being carried by each boom of said plurality of booms, the arrangement being such that said plurality of quilts can be laid contiguously on said spill.

* * * * *